United States Patent Office 2,892,687
Patented June 30, 1959

2,892,687

CONVERSION OF HYDROGEN IODIDE TO IODINE

Thomas J. Deahl, Orinda, Calif., Albert P. Paul, New Brunswick, N.J., and Shelton E. Steinle, Richmond Annex, Calif., assignors to Shell Development Company, New York, N.Y., a corporation of Delaware No Drawing. Application January 17, 1957
Serial No. 634,624

9 Claims. (Cl. 23—216)

This invention relates to a process for recovering elemental iodine from hydrogen iodide. More particularly, this invention relates to a process for oxidizing hydrogen iodide to iodine, employing molecular oxygen as the oxidizing agent, in the presence of a catalyst.

We have discovered that the rate at which hydrogen iodide reacts with molecular oxygen is markedly increased by conducting the reaction in the presence of a substantially neutral, inert porous solid material having a high surface area per unit weight. Thus, we have found that conversion of hydrogen iodide to iodine can be effected at very high rates at temperatures of about 300° C. or less by reacting hydrogen iodide with molecular oxygen in the presence of a porous neutral solid material having a high surface area per unit weight. Our discovery thus provides a basis for a highly flexible, practical process for converting hydrogen iodide to iodine. In its broad aspect, this new process comprises intimately contacting a molecular oxygen-containing gas with hydrogen iodide in the presence of a porous neutral solid material having a high surface area per unit weight and thereafter recovering the product iodine from the reaction zone.

Suitable as the catalyst is any inert solid porous material having a high surface area-to-weight ratio and which is substantially neutral.

By the term "substantially neutral" is meant that the solid material contains no absorbed or adsorbed basic or acidic material, is not impregnated by either a basic or acidic material and does not have an intrinsically acid surface. Excluded are solids which are or may be acidic or basic on their surface or in bulk because of the presence of an acid or a base absorbed, adsorbed or impregnated in or on the solid. Also excluded are those solids which have significant intrinsic surface acidity. The meaning of the term "intrinsic surface acidity," as used herein is set out and discussed in detail in copending application Serial No. 618,456, filed October 26, 1956. Neutral compounds, within this definition, are those in which the intrinsic surface acidity, normally designated by the symbol, $H_0$ (see Hine, "Physical Organic Chemistry," McGraw-Hill, 1956, at pages 59–61 for the derivation and definition of this term) is above about 3.0.

To be effective as the catalyst in the process in the invention, the solid material must be porous and must have a high surface area-to-weight ratio. Thus, the solid material used as catalyst must have a porosity (measured as the number of cubic centimeters of distilled water absorbed per gram of the solid material at ordinary temperature and pressure) of at least about 0.40 cubic centimeter per gram and a surface area of at least about two square meters per gram. It is preferred that the material used as catalyst have a porosity of at least about 0.50 cubic centimeter per gram and that there be substantially no pores having radii greater than about 10,000 Angstroms.

While any solid material having the above-described physical properties may be used as the catalyst, the various argillaceous materials having these properties are most convenient and desirable because of their ready availability in a variety of forms and shapes, their low cost, chemical inertness and physical stability. By "argillaceous material" is meant any material, natural or synthetic, which has the properties commonly associated with clays, clayey materials and/or the ceramic materials resulting from sintering, calcining or otherwise heat treating natural or synthetic clays or clayey materials. Also included are the chemically treated and/or modified clays and clayey materials. By synthetic clayey materials is meant the synthetic mixtures of silica and/or alumina and/or magnesia, and such mixtures which are modified by inclusion of minor amounts of such materials as boria, zirconia and the like. These synthetic materials ordinarily are available in the form of hard particles or granules, prepared by heat treatment of intimate mixtures of the various components. The term "argillaceous material" also is intended to include substantially pure alumina and substantially pure silica, whether in natural form or in the chemically pure state. It must be emphasized that whatever the particular argillaceous material used, the material must be porous, have a high surface area-to-weight ratio and must be neutral, according to the criteria already set out.

The argillaceous material per se may be used as the catalyst, or there may be used a composite solid catalyst comprising more than one argillaceous material or one or more argillaceous materials together with an inert filler or carrier. In such composite catalysts, the argillaceous material may be the major component or but a minor component. Thus, for example, we have found that a commercially available form of diatomaceous earth, containing a minor amount of clay as a binder and calcined to fix its physical form and shape, is an excellent catalyst for the reaction of hydrogen iodide with molecular oxygen. This material is typical of the preferred catalysts of the invention, which are mixtures of diatomaceous earth with a minor but substantial amount of clay which have been calcined to fix the physical form thereof. These solid materials have a porosity of at least 0.50 cubic centimeter per gram, a surface area of at least three square meters per gram, an average pore radius of from about 3500 to about 6500 Angstroms, with about 98% of the pores having a radius of 10,000 Angstroms or less.

The new process is effective for converting hydrogen iodide to iodine regardless of the source of the hydrogen iodide. That is to say, pure hydrogen iodide may be used in the new process, or the hydrogen iodide may be merely one component of a mixture of compounds. From the standpoint of practical operating efficiency, it is desirable, of course, that the hydrogen iodide concentration in the reaction zone be as high as economically feasible.

The conversion of hydrogen iodide to iodine may be carried out in the vapor phase, or it may be carried out in the liquid phase. Where the conversion is carried out in the vapor phase, and the hydrogen iodide is but one component of a mixture of gases, the part of the mixture other than hydrogen iodide may be composed of any material or materials which are substantially inert in the reaction zone. Thus, inert diluents such as nitrogen, helium or other of the inert gaseous elements, carbon dioxide, or other inert gaseous inorganic compounds, or the like, may be present. Also, there may be present gaseous organic material which are not reactive with any one or all of hydrogen iodide, iodine, water, or molecular oxygen in the presence of the material used as catalyst at the temperatures employed. It has been found that the presence of substantial amounts of either or both of water and iodine in the mixture to be treated will not adversely affect the conversion of hydrogen iodide to iodine, despite the fact that it might be expected that, since both compounds appear on the right-hand side of the reaction equation, the presence of either or both of water or iodine might inhibit or limit the desired reaction.

The conversion of hydrogen iodide to iodine according to our discovery also may be carried out in liquid phase. Thus, liquid hydrogen iodide may be oxidized to iodine by this new process. In most cases, however, it will be more convenient to dissolve the hydrogen iodide in water and subject this aqueous solution to contact with molecular oxygen according to the new process. The presence of aqueous water does not appear to inhibit the desired reaction significantly. Also, the presence of substantial amounts of iodine in the reaction mixture does not appear to inhibit or limit the desired reaction. However, it may be desirable to limit the amount of iodine in the reaction mixture. It is preferred that where iodine is present the molar ratio of iodine to hydrogen iodide not exceed one.

Molecular oxygen from any source may be used. Thus, pure molecular oxygen is suitable, as are mixtures of molecular oxygen with other gases, such as commercially pure (95%) oxygen, oxygen-enriched air, or air itself.

Where conversion of the hydrogen iodide is to be effected in the vapor phase, the amount of molecular oxygen used preferably is at least the amount theoretically required to convert all of the hydrogen iodide present in the reaction zone to iodine. In some cases, it may be found convenient and desirable to use somewhat less than the theoretical minimum amount of molecular oxygen. Generally, however, to insure maximum conversion of hydrogen iodide to iodine, it is desirable that the amount of molecular oxygen fed be moderately in excess of the theoretical minimum. In such cases, the excess of oxygen should amount to at least 10% over that theoretically required, and it is preferred that at least a 50% excess of oxygen be present in the reaction zone. A large excess of oxygen is not necessary, and in most cases will be undesirable because it is uneconomical. Usually, little advantage will accrue from the use of more than about a 500% excess of oxygen, and in most cases it is preferable that the amount of oxygen exceed the amount theroetically required to oxidize all of the hydrogen iodide present by from about 50% to about 350%. When air or other source of molecular oxygen containing an inert diluent gas is used, precaution should be taken to insure that there is a substantial proportion of each of hydrogen iodide and molecular oxygen in the reaction zone.

Where the conversion of hydrogen iodide to iodine is to be effected in the liquid phase, somewhat greater excesses of molecular oxygen usually are required than when the conversion is to be carried out in the vapor phase. Thus, it normally will be found necessary, when conducting the reaction in the liquid phase, to maintain at least about a 25% excess of molecular oxygen in the reaction zone, and in some cases as much as a 200-fold excess of oxygen will be found desirable. Preferably, the excess of oxygen is at least 50%; an excess of more than about 100-fold is not often required, for such large excesses provide little advantage over somewhat lesser excesses and are usually uneconomic and present operating difficulties.

When operating in the liquid phase, it is essential to the effective oxidation of hydrogen iodide that there be a substantial partial pressure of molecular oxygen in the reaction zone. Thus, the oxygen partial pressure should be at least 10 p.s.i., and optimum oxidation rates are usually obtained only when the oxygen partial pressure is 20 p.s.i. or more. While much higher oxygen partial pressures may be used—for example, up to 200 p.s.i. or even more—in general, little added advantage results from the use of oxygen partial pressures in excess of about 100 p.s.i.

A primary factor in effecting the reaction between hydrogen iodide and molecular oxygen in the presence of a liquid phase at practical rates is the maintenance of intimate contact between the gas and liquid phases; practical reaction rates can be obtained only when a very high degree of contact between the gas and liquid phases is maintained. Means for obtaining and maintaining intimate contact between gases and liquids are well known in the art. Any of the known methods may be used in the process of this invention. For example, the reaction mixture may be stirred or otherwise thoroughly agitated, or the liquid materials may be passed in countercurrent flow to the gaseous materials in a tower packed with an inert packing or the catalyst, or in a tower equipped with devices for insuring intimate gas-liquid contact, including towers equipped with grid trays, bubble plates, rotary disc contactors or the like. The particular method chosen should be, of course, capable of effecting the necessary degree of contact in the presence of the solid catalyst. The catalyst may be in the form of a fine powder, or in granular form, as may be most convenient and effective.

The conversion of hydrogen iodide to iodine is effected at any temperature above about 50° C.; however, the reaction rate increases significantly with temperature. When operating in the vapor phase, the minimum temperature is determined by one of two factors: first, if it is desired that the product iodine be obtained in liquid phase, it will, of course, be necessary to conduct the reaction at a temperature above the melting point of iodine (113.5° C.); second, if there is present in the reaction zone any material which condenses at a temperature above the melting point of iodine, or if it is desired to recover the product iodine as a solid and there is present in the reaction zone any material which condenses at any temperature above about 50° C., then the dewpoint of the material which will so condense fixes the minimum reaction temperature. From the standpoint of the reaction of hydrogen iodide with molecular oxygen to form iodine, per se, there is no maximum limit on the temperature at which the reaction may be conducted. However, temperatures above about 400° C. will not be required, for at this temperature level, and in most cases, at temperatures substantially below this level, the reaction of hydrogen iodide with molecular oxygen proceeds at very high rates. Practically satisfactory reaction rates are obtained at temperatures substantially below 400° C., for example, at temperatures of from about 100° C. to about 300° C. Because of the substantial advantages obtained, from the standpoint of corrosion and the useful materials of construction available, by conducting the reaction at as low a temperature as possible consistent with a feasible reaction rate, reaction zone temperatures of from about 100° C. to about 250° C. are most suitable. When operating in the liquid phase, the maximum temperature is, of course, that of the boiling reaction mixture at the pressure used. It is normally desirable to conduct the reaction at temperatures somewhat lower than that at which the reaction mixture boils, since boiling mixtures do not absorb gases (in this case, molecular oxygen) readily. Preferably, when the reaction is carried out in the liquid phase, the temperature is at least about 80° C.

The conversion of hydrogen iodide to iodine in the vapor phase may be carried out at any pressure. Operation at substantially atmospheric pressure is quite practical, and in a great many cases will be found to be the most convenient operating pressure. Few, if any, substantial advantages are obtained by operating at reduced pressure, but in many cases, it will be found both convenient and desirable to conduct the reaction at moderately elevated pressures. For example, pressures of up to about 500 p.s.i.g. may be used to reduce the volume of gases to be handled. Where the conversion is carried out in the liquid phase, the minimum pressure which can be used normally will be determined by the oxygen partial pressure desired. If pure oxygen is used, the system pressure need not be substantially greater than the oxygen partial pressure used. If air, or other mixture of oxygen with an inert gas is used, then the system pressure will be correspondingly greater to furnish the requisite oxygen partial pressure. In some cases, the use of elevated pressures may be desirable to reduce the volume of gases handled and/or to increase the boiling temperature of the hydrogen iodide solution in the reaction zone. Pressures in excess of about 500 p.s.i.g. will seldom be found advantageous or desirable, as compared to somewhat lower pressures.

At the temperatures set out above, practically feasible hydrogen iodide conversion levels are obtained in a few seconds reaction time. For example, when operating in the vapor phase, at temperatures of from about 150° C. to about 200° C., using typical catalysts of this invention, substantially quantitative conversion of hydrogen iodide to iodine is effected at residence times of the magnitude of about 1 to about 10 seconds. At higher temperatures, the required residence time is correspondingly lower. When operating in the liquid phase, with adequate means for insuring intimate contact between the gas and liquid phases in the reaction zone, substantially complete reaction is obtained in form about 30 to about 60 minutes.

Recovery of the product iodine from the effluent from the reaction zone may be effected by known methods, the method used depending upon whether the conversion of hydrogen iodide to iodine was effected in the liquid phase or in the vapor phase, upon the extent to which the hydrogen iodide was converted to iodine, and upon the nature of the components of the effluent other than iodine, water and hydrogen iodide, if any be present. If the conversion of hydrogen iodide to iodine is substantially 100%, and the conversion of hydrogen iodide was effected in aqueous liquid phase, the product iodine is immiscible with the aqueous phase and the two phases may be separated by decantation where the iodine is liquid, or by filtration, centrifuging or the like, where the iodine is solid. If the conversion of hydrogen iodide to iodine is substantially 100%, and the conversion of the hydrogen iodide to iodine was effected in vapor phase, the iodine may be recovered most simply by cooling the effluent vapors to form liquid water and liquid or solid iodine, from which the iodine is recovered by phase separation as where the hydrogen iodide conversion was carried out in aqueous liquid phase. Where the conversion of the hydrogen iodide is incomplete, the effluent will contain both iodine and hydrogen iodide. Where the conversion of hydrogen iodide was carried out in aqueous liquid phase, or in the aqueous liquid phase resulting from condensation of the effluent vapors where the conversion of hydrogen iodide was carried out in the vapor phase, the hydrogen iodide and, to a certain extent, the iodine will be dissolved in the aqueous phase. In many cases it will be found possible to so control the degree of hydrogen iodide conversion and the amount of water present in the effluent so that the amount of iodine formed exceeds substantially the amount of iodine which will dissolve in the hydrogen iodide solution obtained from the effluent. This permits direct removal of a substantial part of the product iodine by simple phase separation. The iodine dissolved in the hydrogen iodide solution may be recovered by treating the solution with a strong oxidizing agent, such as chlorine, to convert the remaining hydrogen iodide to iodine, and the iodine is separated from the water by simple phase separation. Alternatively, the iodine dissolved in the hydrogen iodide solution may be recovered by passing an inert gas through the solution and recovering iodine from the effluent gases. This method for selectively removing iodine from mixtures of iodine, hydrogen iodide and water is disclosed and claimed in copending application Serial No. 594,893, filed June 29, 1956. Where the oxidation of hydrogen iodide is conducted in the liquid phase, this method may be used to advantage to recover iodine directly from the reaction mixture. Thus, it will be found that if a part of the gaseous portion of the reaction mixture be removed from the reaction zone, the gaseous material contains iodine and water, but no hydrogen iodide. Recovery of the iodine content of such mixtures is easily effected by the methods already set out herein.

This constitutes a general description of the process of the invention; the following examples illustrate specific applications of this process. It is to be understood that these examples are for the purpose of illustration only and that the invention is not to be regarded as limited in any way to the specific conditions cited therein.

*Example I*

A vaporous mixture of 23% by weight hydrogen iodide, 12% by weight iodine and 65% by weight water was mixed with sufficient air to provide twice as much molecular oxygen as would theoretically be required to react with all of the hydrogen iodide and the entire mixture was continuously passed through a tubular reactor packed with Celite VIII. Celite VIII is a commercially available (Johns-Manville Co.) composite solid material composed of a major proportion of diatomaceous earth and a minor proportion of a clay binder, the whole mixture having been calcined. The catalyst was in the form of pellets 5/32 inch in diameter and 1/4 inch long. The material had a total porosity of 0.61 cubic centimeter per gram, a total surface area of approximately 3 square meters per gram and a pore distribution of: 2% of pores having a radius in excess of 10,000 Angstroms and 98% of pores having a radius of less than 10,000 Angstroms but more than 500 Angstroms. The material was neutral, having an intrinsic surface acidity corresponding to an $H_0$ greater than 3.5. The temperature of the catalyst bed was so maintained that the temperature of the effluent gases was 150° C. The apparent residence time was 10.0 seconds. The conversion of hydrogen iodide to iodine was substantially quantitative (99.8%).

*Example II*

The procedure set out in Example I was repeated, the conditions being varied to establish the effect of reaction temperature and other process variables on the rate and degree of conversion of hydrogen iodide to iodine in the vapor phase. In typical experiments, using the same source of hydrogen iodide and the same catalyst as was used in the experiment of Example I, the following results were obtained:

| Experiment No. | Reaction Zone Temperature | Excess of Air (Percent) | Residence Time (Seconds) | Percent of Hydrogen Iodide Converted to Iodine |
|---|---|---|---|---|
| 2 | 200 | 100 | 8.9 | Substantially quantitative. |
| 3 | 125 | 100 | 11.7 | Do. |
| 4 | 150 | 10 | 5.9 | Do. |
| 5 | 150 | 10 | 2.25 | 98.4. |
| 6 | 150 | 10 | 0.85 | 72.5. |

*Example III*

The procedure of Example I was again repeated, employing a silica gel as catalyst. The reactor effluent temperature was 150° C. The apparent residence time was 0.91 second. A 10% excess of air was used. 24% of the hydrogen iodide was converted to iodine.

The catalyst was a high purity silica gel having a porosity of 0.55 cubic centimeter per gram and a surface area of approximately 750 square meters per gram. The gel was prepared by neutralizing high purity sodium silicate with hydrochloric acid to a pH of 5, washing the hydrogel with water, with dilute hydrochloric acid and again with water, and drying the washed hydrogel at 120° C. The gel was neutral.

While the process of this invention is applicable to effect the oxidation of hydrogen iodide from any source, the process is of primary interest for recovering elemental iodine from the effluents of processes which employ iodine as a reactant to remove hydrogen atoms from organic materials, thus changing the carbon-to-carbon structures of such materials. In such processes, since one mole of hydrogen iodide is formed per hydrogen atom removed, the effluent vapors contain large amounts of hydrogen iodide. Also, in many cases, the product of the dehydrogenation is quite reactive with hydrogen iodide and/or iodine at the reaction temperatures, and to prevent undesirable side-reactions it is necessary to substantially reduce the temperature of the effluent gases immediately on their emergence from the reactor, and/or to dilute those gases substantially. Such quenching and/or dilution often is most conveniently accomplished by quenching the effluent gases with water, or by adding steam to the effluent gases; in these cases, the source of hydrogen iodide also contains water. Since iodine is expensive, it must be recovered from such effluent streams. The process of the invention is admirably suited to recovery of iodine from hydrogen iodide contained in the effluent streams from such processes, for it effects the oxidation of hydrogen iodide directly from such effluent streams. Further, the process of the invention is eminently suited for the conversion of large amounts of hydrogen iodide, for it employs a very cheap widely available oxidizing agent (oxygen) and an inexpensive, widely available catalyst, is operationally quite simple and effects a high degree of conversion of hydrogen iodide under practically feasible conditions.

In some cases, it may be found desirable to conduct the oxidation of hydrogen iodide in two or more consecutive stages, employing the process of this invention in each of the stages. In such operation, the oxidation of hydrogen iodide in each stage may be conducted in the presence of the same or a different catalyst. In come cases, it will be found desirable to remove the product iodine formed in each stage, the iodine-free effluent being passed to the next stage. Also, it may be found desirable to increase the concentration of hydrogen iodide in the effluent of one stage before that effluent is passed to the next stage. Such reconcentration of the effluent can be conveniently effected by fractionation of the liquid effluent to remove water overhead. It will be appreciated that these, and other modes of applying the principle of the invention, may be employed, and obviously many modifications and variations of the invention, as hereinbefore set forth, may be made without departing from the spirit and scope of the invention, as disclosed hereinbefore and as defined in the hereto appended claims.

We claim as our invention:

1. A process for oxidizing hydrogen iodide to iodine which comprises reacting hydrogen iodide with molecular oxygen as the only oxidizing agent in contact with the surface of a porous, substantially neutral solid argillaceous material as the sole catalyst, said solid material having a porosity of at least about 0.40 cubic centimeter per gram and a surface area of at least about two square meters per gram, and recovering iodine from the resulting reaction mixture.

2. A process for oxidizing hydrogen iodide to iodine which comprises reacting hydrogen iodide with molecular oxygen as the only oxidizing agent in contact with the surface of a porous solid argillaceous material as the sole catalyst, said solid material having a porosity of at least about 0.40 cubic centimeter per gram, a surface area of at least about two square meters per gram and having an intrinsic surface acidity ($H_0$) of more than about 3.0, and recovering iodine from the resulting reaction mixture.

3. A process for oxidizing hydrogen iodide to iodine which comprises reacting hydrogen iodide with molecular oxygen as the only oxidizing agent at a temperature from about 50° C. to about 400° C. in contact with the surface of a porous, substantially neutral solid argillaceous material as the sole catalyst, said solid material having a porosity of at least about two square meters per gram, and recovering iodine from the resulting reaction mixture.

4. A process for oxidizing hydrogen iodide to iodine which comprises passing a gaseous mixture comprising hydrogen iodide and molecular oxygen as the only oxidizing agent in intimate contact with the surface of a porous, solid argillaceous material as the sole catalyst maintained at a temperature of from about 50° C. to about 400° C., said solid material having a porosity of at least about 0.40 cubic centimeter per gram, a surface area of at least about two square meters per gram, and an intrinsic surface acidity ($H_0$) of more than about 3.0, and recovering iodine from the effluent gases.

5. The process of claim 4 wherein the solid argillaceous material contains substantially no pores having radii greater than about 10,000 Angstroms.

6. A process for oxidizing hydrogen iodide to iodine which comprises passing a gaseous mixture comprising hydrogen iodide and molecular oxygen as the only oxidizing agent in intimate contact with the surface of a calcined, clay-bonded diatomaceous earth as the sole catalyst maintained at a temperature of from about 50° C. to about 400° C., said diatomaceous earth having a porosity of at least about 0.40 cubic centimeter per gram and a surface area of at least two square meters per gram, and recovering iodine from the effluent gases.

7. A process for oxidizing hydrogen iodide to iodine which comprises intimately contacting at a temperature of at least about 50° C. a liquid aqueous solution of hydrogen iodide with a molecular oxygen-containing gas as the only oxidizing agent in contact with the surface of a solid argillaceous material as sole catalyst, said solid argillaceous material having a porosity of at least about 0.40 cubic centimeter per gram, with substantially no pores having radii greater than about 10,000 Angstroms, a surface area of at least two square meters per gram, an intrinsic surface acidity ($H_0$) of more than about 3.0, the partial pressure of molecular oxygen in the reaction zone being at least ten pounds per square inch, and recovering iodine from the resulting reaction mixture.

8. The process of claim 1 wherein the catalyst is silica gel.

9. The process of claim 1 wherein the catalyst is alumina.

References Cited in the file of this patent

UNITED STATES PATENTS

| | | |
|---|---|---|
| 1,311,175 | Meyers | July 29, 1919 |
| 2,240,668 | Reed | May 6, 1941 |
| 2,312,952 | Balcar | Mar. 2, 1943 |
| 2,395,314 | Blumer | Feb. 19, 1946 |